Figure 1:
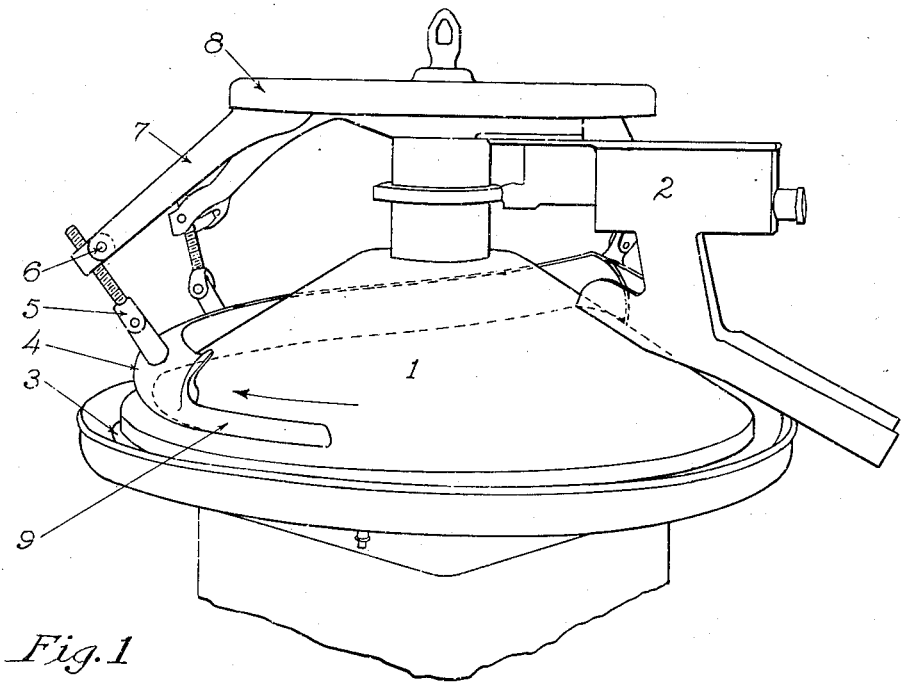

July 14, 1936.  E. W. PLAMBECK  2,047,430
LOAF ROUNDER
Filed April 11, 1935  2 Sheets-Sheet 1

Inventor
EMIL W. PLAMBECK
By George B. Willcox
Attorney

July 14, 1936.  E. W. PLAMBECK  2,047,430
LOAF ROUNDER
Filed April 11, 1935  2 Sheets-Sheet 2

Inventor
EMIL W. PLAMBECK

By George B. Willcox
Attorney

Patented July 14, 1936

2,047,430

UNITED STATES PATENT OFFICE 2,047,430

LOAF ROUNDER

Emil W. Plambeck, Saginaw, Mich., assignor to Baker Perkins Company, Inc., Saginaw, Mich., a corporation of New York Application April 11, 1935, Serial No. 15,740

2 Claims. (Cl. 107—9)

This invention relates to dough rounders of the general type consisting of an endless moving surface, as of a rotating cone, and a stationary trough co-operating with the surface. Such rounders are used to work and roll freshly cut or "divided" raw dough pieces until a tough non-adhesive skin is formed over the dough pieces and they are rounded into practically spherical form, ready for the next step of the bread making process.

The principal object of this invention is to provide an improved trough for a dough rounder which will handle without change or adjustment dough pieces of a wide range of sizes. Another object is to increase the positiveness and effectiveness of the kneading and working of each dough piece as it is carried through the stationary trough by the moving surface of the rounder.

In rounders heretofore available, the range in size of the dough pieces which any one machine could handle was limited. For example, a rounder with a rounding trough of given size might handle dough pieces weighing from twenty ounces to approximately thirty six ounces, but this machine could not satisfactorily round dough pieces as small as eleven ounces or as large as forty eight ounces in weight. Hence in a bakery making rolls and loaves of these various sizes it has been necessary to employ as many as three separate machines.

With the rounder trough of uniform semi-circular cross-section employed in the earlier machines, adapted to handle thirty six ounce dough pieces, a small piece would not be worked effectively, since there was insufficient surface contact of the dough piece with the inner surface of the trough to produce the required rolling and turning of the dough piece. On the other hand, if a large piece weighing, say, forty-eight ounces was put into this machine it had excessive contact with the trough, so that there was more or less slippage between the moving surface of the cone and the dough piece. This slippage sometimes resulted in the spinning of the dough piece at the entrance to the trough and caused the traveling surface to become undesirably coated with dough, so that the succeeding pieces through the machine would stick and be damaged. A further result of the delay in getting the dough piece to enter the trough was the formation of a tough skin on the dough piece, so that, as a baker would say, the dough piece was "burnt".

This invention permits dough pieces of a wide range of sizes to be handled with uniform efficiency, so that a single machine can do the work for which heretofore two or three have been required, and consists of a simple structural modification of the old and well known rounder trough.

The trough has been provided with an internally projecting broad-based bead, integral with the trough. This bead extends lengthwise of the trough and is spaced somewhat from its lower peripheral edge, to define two parallel channels. This bead is largest in cross-section area at or near the intake end of the trough, i. e. it projects farthest from the trough at that place, and is gradually reduced in size from that point, so that it merges with the trough wall at a substantial distance from the intake end thereof. The length of this bead is sufficient for working the dough pieces adequately and forming on them the desired skin, and the balance of the trough, which is conventional in design, completes the rounding after the preliminary working and forming of the dough piece has been completed. A machine having a trough built according to the invention and designed to handle the largest size dough pieces is able with equal facility and effectiveness to handle medium size and small pieces. They are worked thoroughly, and the rounding is effected rapidly, without tearing or so-called "burning" of their surfaces.

Figure 5:
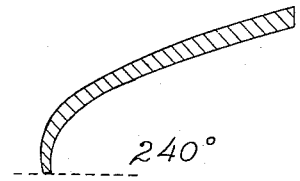
Figure 6:
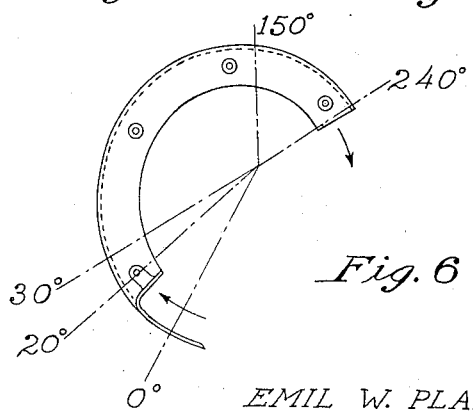
Figure 7:
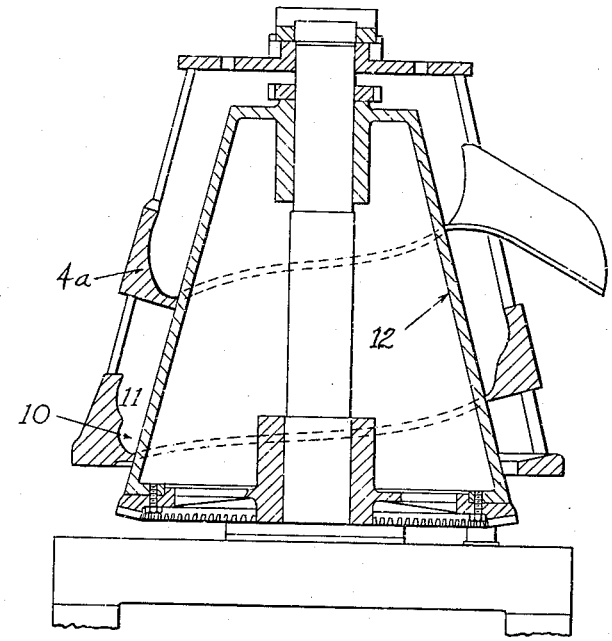
Figure 8:
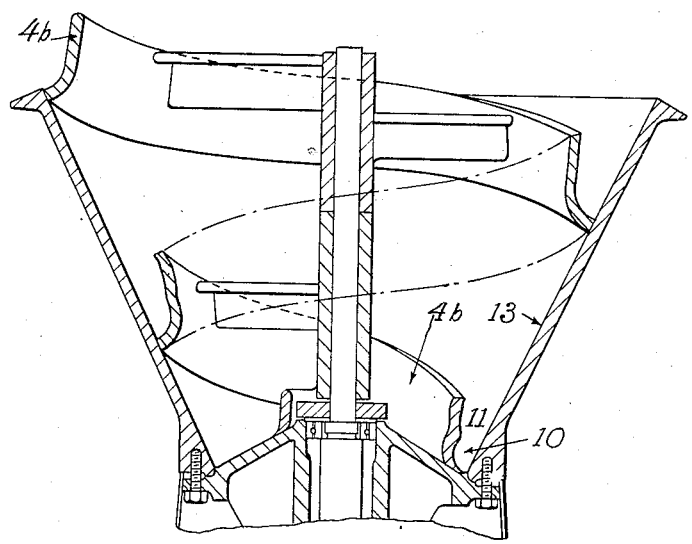

Further objects and operating advantages of the invention will be set forth in the following description, of which the appended drawings form a part, and in which Fig. 1 is a fragmentary side view in perspective of a rounder of the cone-table type embodying my improvement, Figs. 2 to 5 inclusive show transverse sections through the improved rounding trough at various places along its length, Fig. 6 is a plan view of the trough, Fig. 7 is a fragmentary vertical section of a rounder having a steep cone table, to which the invention has been applied, and Fig. 8 is a fragmentary vertical section of a rounder of the bowl type, showing the invention applied thereto.

Referring to Fig. 1, the machine consists of a rotatable cone 1 having the usual flour dusting mechanism 2, a panel rim 3 around the lower edge of the cone, and an inverted spiral molding trough 4, embodying the invention. Trough 3 is supported in fixed position above and in co-operative relationship to the working face of the cone 1 by means of adjustable hangers 5. The hangers are swiveled at 6 to brackets 7 which are carried by a fixed central member 8. The cone is driven by means not shown, in the direction of the arrow, and dough pieces are fed in known manner to the rotating cone 1 above the guide rail 9 on the trough 4, so that the cone carries them into the trough.

The improved molding trough has a new configuration and arrangement of its inner working face beginning at or near its intake end and extending through a substantial part of its length.

The large sectional views, Figs. 2 to 5, show the novel configuration referred to, although they are not to be understood as limiting the invention to the precise form shown, because variations in the form illustrated may be made without departing from the essential invention, for the requirements of different machines and varying types of doughs to be handled.

Figure 2:
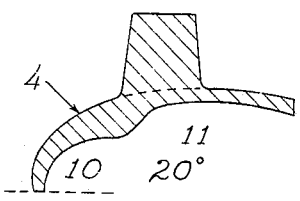
Figure 3:
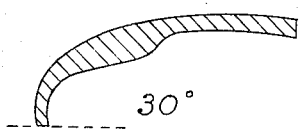
Figure 4:
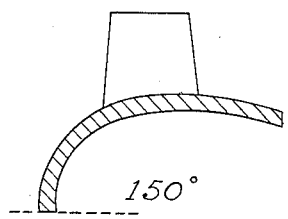

Figs. 2, 3, and 4 are taken through the trough 4 along the lines designated in Fig. 6 as twenty degrees, thirty degrees, and one hundred fifty degrees, respectively, and Fig. 5 is a section taken at the end of the trough, designated in Fig. 6 as two hundred forty degrees.

At the intake end of the trough 4 (see Fig. 2) the shape of its inner face is such as to define with the rotating cone 1 two channels, one of small capacity, designated by numeral 10, the other, 11, of large capacity.

Small dough pieces seek the lower smaller channel 10 which is of appropriate shape to work and round them satisfactorily. Pieces of medium size and larger are handled in both channels 10 and 11. In operation every dough piece, whether small, medium, or large, is worked with equal effectiveness in its passage through the trough 4. In each instance there is provided adequate downward constraint by the trough to force the dough pieces to roll thereon and not spin and slide, as it is being rotated by the action of the revolving cone 2.

In the case of medium or large dough pieces, which constitute the bulk of ordinary bakery production, an improved working of the dough piece is obtained by virtue of the tapered rib or bead member between the two channels 10, 11, the lateral edges of which conform with the faces of the channels. In the rounding of dough pieces for bread it is desirable, prior to the formation of a tough gas-proof skin, that as much gas as possible be eliminated. As a loaf rolls under the beaded portion of the trough, gas is squeezed from the center of the piece toward its ends, where it is expelled. Furthermore, because of the conical form of the usual rounder table there is produced, in addition to this rolling action relative to the trough, a simultaneous slower turning movement about another axis. That is, the dough piece, as it rolls under the bead of the rounder trough also turns end-for-end so that all parts of it in turn are subjected to the squeezing action of the bead. Thus virtually all excess gas is worked toward the ends of the piece and is eliminated before the skin of the dough piece becomes sealed.

As the dough pieces of medium and larger sizes travel along the initial portion of the trough the central bead thereof gradually decreases in size, and channels 10 and 11 merge. After a dough piece leaves the end of the beaded portion of the trough its final shaping and rounding is completed in the usual manner by the remainder of the trough, which is of conventional shape.

Small dough pieces are worked entirely in channel 10 of the trough, which provides a channel of an area suited to work and initially round such pieces satisfactorily in the ordinary manner. Thus a special trough of small dimensions is not needed.

An important advantage of the improved trough is that as the bead on the inner wall is progressively tapered from its greatest cross-sectional area near the intake end of the trough until it disappears where its remote end merges into the trough wall the trough delivers every dough piece in very nearly spherical form, so that they are ready for easy handling and depositing into the pockets of the dough proofer when they are discharged for the next step in the making of bread.

Fig. 7 shows the invention applied to the trough 4a of a rounder having a steep cone table 12, but which is basically similar to that of Fig. 1. Fig. 8 shows the improvement applied to a bowl-type rounder in which the trough 4b co-operates with the inner wall of a rotating cone 13. In both cases the operation of the improved trough in conjunction with the rotating surface is the same as in the rounder shown in Fig. 1, and therefore, no additional description of the construction or operation of these machines is necessary.

While I have shown the invention in a preferred form as applied to certain specific types of rounders, various changes can be made in its shape, size and arrangement for different applications without departing from the spirit of the invention and the scope of the appended claims. For instance, it may be adapted to use with rounders employing flat turntables, or endless belts for co-operation with their rounding troughs.

Having thus described my invention, what I claim and desire to secure by Letters Patent is:

1. In a dough-piece rounder having a traveling table, a co-operative stationary trough, and a bead member integral with and projecting from the inner face of said trough beginning at the intake end and extending lengthwise thereof, said bead member merging at its lateral edges into the said face, the cross-sectional area of said bead member being greatest near the intake end of the trough, its end remote from said intake end merging into the trough wall, and its intermediate portion being of gradually diminishing size; said bead member being so constructed and arranged that the trough is divided thereby into two channels of lesser radius than the trough adapted to operate singly or together on material pieces of various sizes.

2. A rounder trough having, in combination, a bead member projecting from the inner face of said trough beginning at and extending lengthwise from the intake end thereof, the lateral edges of said member conforming with said face, the said bead member presenting its greatest cross-sectional area near the intake end of the trough, its end remote from said trough intake merging into the trough wall, and its intermediate portion being of gradually diminishing size.

EMIL W. PLAMBECK.